(12) United States Patent
Matubara

(10) Patent No.: US 6,220,735 B1
(45) Date of Patent: Apr. 24, 2001

(54) AIMING AND LEVELING MECHANISM FOR A VEHICLE HEAD LAMP

(75) Inventor: Masao Matubara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/348,831

(22) Filed: Jul. 8, 1999

(30) Foreign Application Priority Data

Aug. 4, 1998 (JP) .................................................. 10-220084

(51) Int. Cl.[7] .................................................. B60Q 1/10
(52) U.S. Cl. .......................... 362/523; 362/528; 362/530; 362/529; 362/275; 362/269; 362/421; 362/37; 362/39; 362/40; 362/464; 362/465; 362/466; 362/467; 362/468; 362/415; 362/531; 362/532; 362/515; 362/523
(58) Field of Search .................................... 362/528, 530, 362/529, 275, 269, 421, 37, 39, 40, 464–68, 415, 531, 532, 515, 523

(56) References Cited

U.S. PATENT DOCUMENTS 5,003,436 * 3/1991 Yamada et al. .......................... 362/61
5,908,239 * 6/1999 Sugimoto .............................. 362/528

* cited by examiner

*Primary Examiner*—Sandra O'Shea
*Assistant Examiner*—Anabel Ton
(74) *Attorney, Agent, or Firm*—Sughrue, Mion, Zinn, Macpeak & Seas, PLLC

(57) ABSTRACT

A head lamp for vehicle use is provided, which includes a intermediate tilting member tiltably supported by a lamp body at three points. One point acts as a tilting fulcrum, while the other two points are supported by an aiming adjusting member of an aiming adjusting mechanism, for changing positions of the intermediate tilting member with respect to the lamp body. The head lamp also includes a reflector which is tiltably supported by the intermediate tilting member at three support points, wherein two points are formed into tilting fulcrums, and the other point is supported via a leveling actuator of a leveling adjusting mechanism, for changing a position of the reflector with respect to the intermediate tilting member by an automatic operation or a remote operation.

6 Claims, 6 Drawing Sheets

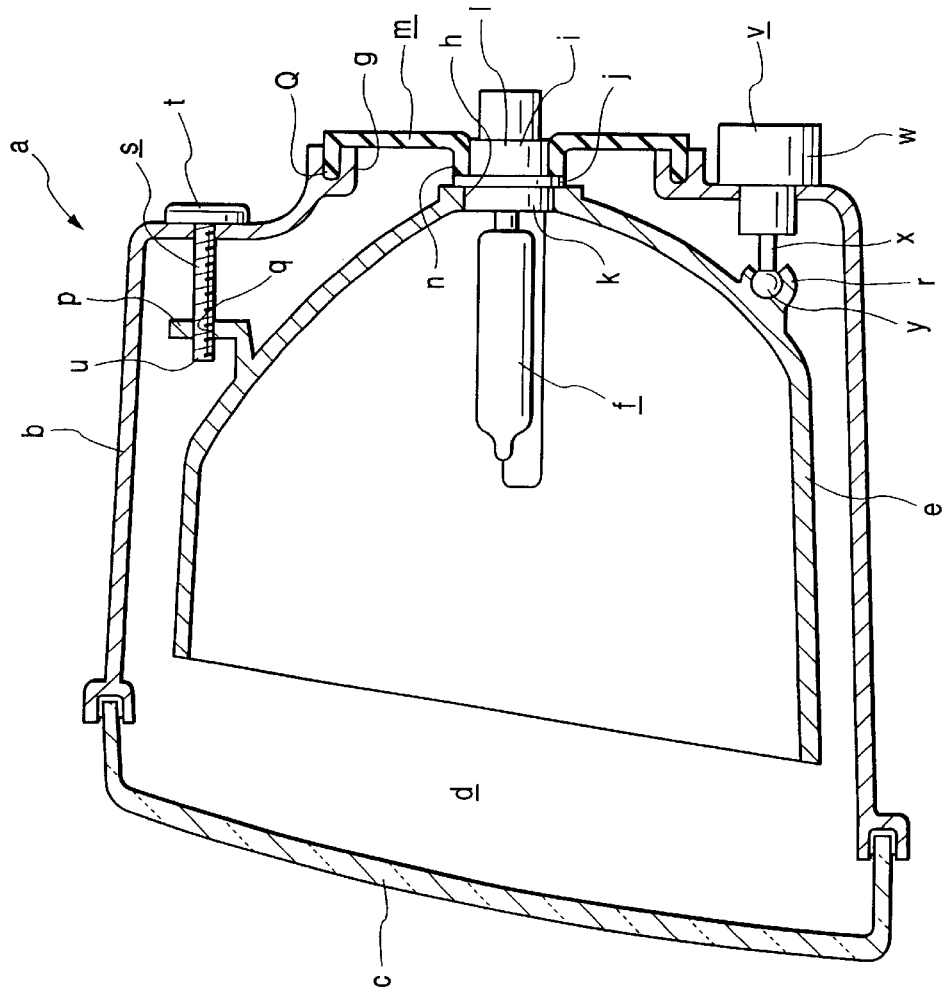

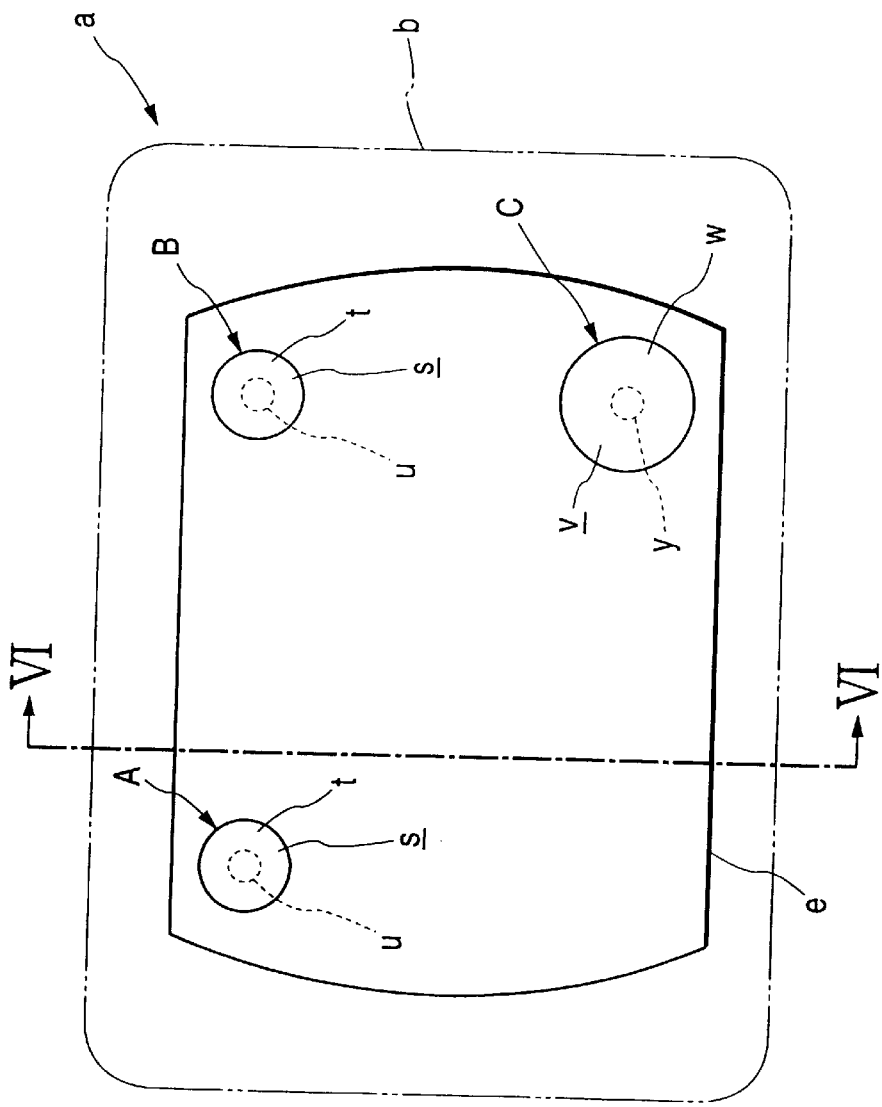

US 6,220,735 B1

AIMING AND LEVELING MECHANISM FOR A VEHICLE HEAD LAMP

BACKGROUND OF THE INVENTION

1. Technical Field of the Invention

The present invention is directed to a head lamp for a vehicle. More particularly, the present invention relates to an aiming and a leveling mechanism which are independently provided for aiming and leveling a vehicle head lamp.

2. Description of the Background Art

A vehicle head lamp has an aiming mechanism for conducting an aiming adjustment by which an extending direction of an optical axis with respect to a vehicle body is adjusted upon completion of manufacturing a vehicle or at an official check-out of a vehicle. In addition, the head lamp has a leveling mechanism for conducting a leveling adjustment by which an extending direction of an optical axis is adjusted according to a weight of a load carried by the vehicle and also according to a position of the load on the vehicle.

FIGS. 6 and 7 show a conventional example of the above discussed vehicle head lamp.

The head lamp "a" for vehicle use is composed of a light source bulb "f" attached to a reflector "e" arranged in a lighting device space "d" which is formed by a container-shaped lamp body "b", the front portion of which is open, and a lens "c" which covers the opening of the lamp body "b".

At the rear of the lamp body "b", an insertion hole "g" is formed.

At the rear of the reflector "e", a light bulb attaching hole "h" is formed. The light source bulb "f" is provided in the light bulb attaching hole "h". The light source bulb "f" has a base section "i" which includes a flange section "j", a section "k" to be attached to the reflect "e", which is located on the front side of the flange section "j", and a cover attaching section "l" located at the rear of the flange section "j". The section "k" of the light source bulb "f", is set in the light bulb attaching hole "h".

A rubber cover "m" has an annular profile, and an inner circumferential edge "n" of the rubber cover "m" is attached to the cover attaching section "l" of the light source bulb "f". An outer circumferential edge "o" of the rubber cover "m" is attached to an opening edge of an insertion hole "g" of the lamp body "b". As described above, since the inner circumferential edge "n" of the rubber cover "m" is attached to the cover attaching section "l" and at the same time the outer circumferential edge "o" is attached to the opening edge of the insertion hole "g", the insertion hole "g" is covered with the rubber cover "m". Therefore, the rubber cover "m" prevents entrance of water and dust from the insertion hole "g" into the lighting device space "d".

On the back of the reflector "e", there are provided two support sections "p", "p" which are protruded and transversely separated from each other, wherein only one support section is shown in FIG. 6. At a lower end portion of the reflector "e", there is provided a ball bearing section "r" which is located at a position under the left support section "p".

An aiming screw "s", "s" is composed of a head section "t", "t", and a screw shaft section "u", "u". Each screw shaft section "u", "u" is inserted into the lamp body "b" from the back and screwed to each screw hole "q", "q" of each support section "p", "p" formed in the reflector "e".

A leveling actuator "v" is arranged so that a connecting shaft "x" is protruded from a main body "w" and a spherical section "y" is integrally formed at an end of the connecting shaft "x". The leveling actuator "v" is operated so that the connecting shaft "x" is moved in the longitudinal direction by an automatic operation or a remote operation.

When the main body "w" of the leveling actuator "v" is attached from the outside to a lower end section of the lamp body "b", the spherical section "y" is connected to the ball bearing section "r" formed in the reflector "e". Accordingly, as shown in FIG. 6, a portion of the leveling actuator "v" is protruded backward from the lamp body "b".

As described above, the reflector "e" is supported by the lamp body "b" at three points A, B and C via the aiming screws "s", "s" and the leveling actuator "v", as shown in FIG. 7.

Aiming adjustment is conducted when the head sections "t", "t" of the aiming screws "s", "s" are rotated.

For example, when the head section "t" of the right aiming screw "s" is rotated, the screw shaft "u" is screwed into the screw hole "q" of the reflector "e" according to the rotation of the screw shaft "u", or alternatively the screw shaft "u" is screwed back in the screw hole "q" of the reflector "e". Due to the foregoing, an interval between the reflector "e" and the lamp body "b" at support point A is changed. Therefore, the reflector "e" is tilted around a tilting axis connecting the two rest support points B and C.

Leveling adjustment is conducted in such a manner that the connecting shaft "x" of the leveling actuator "v" is moved in the longitudinal direction.

When the connecting shaft "x" is moved in the longitudinal direction, an interval between the reflector "e" and the lamp body "b" at support point C is changed. Therefore, the reflector "e" is tilted around a tilting axis connecting the two rest support points A and B.

With this arrangement, the various devices and mechanisms for aiming and leveling the lamp are provided in a limited space.

In the above conventional head lamp "a" for vehicle use, the leveling actuator "v" is attached to the lamp body "b" so that the reflector "e" can be tilted with respect to the lamp body "b" when leveling adjustment is conducted. Therefore, a portion of the leveling actuator "v" is protruded backward from the lamp body "b". Consequently, since the leveling actuator "v" is protruded, the protruding portion tends to interfere with other devices and mechanisms. For the above reasons, depending upon a type of vehicle, it is impossible to ensure a sufficiently large space for arranging the head light "a" for vehicle use to which the actuator "v" is attached. In this case, it becomes necessary to change an attaching position of the leveling actuator "v" with respect to the head lamp "a" for vehicle use. That is, it is necessary to give consideration to an attaching position of the leveling actuator "v" for each type of vehicle.

When the attaching position of the leveling actuator "v" with respect to the head lamp "a" for vehicle use is changed, other support points A and B must be changed according to the change in the attaching position of the leveling actuator "v". As a result, a forming position of each support point with respect to the head lamp "a" for vehicle use is restricted.

SUMMARY OF THE PRESENT INVENTION

The present invention solves the above problems by providing an improved arrangement for the aiming and leveling mechanisms.

In order to solve the above problems, the present invention provides a head lamp for vehicle use which comprises an intermediate tilting member tiltably supported by a lamp body, and a reflector being tiltably supported by the intermediate tilting member. The intermediate tilting member is supported by the lamp body at three points, one of the points is a tilting fulcrum, and the other two points are supported via an aiming adjusting member for changing positions of the support points with respect to the lamp body. The reflector is supported by the intermediate tilting member at three support points, two of the points are formed into tilting fulcrums, and the other point is supported via a leveling actuator for changing a position of the support points with respect to the intermediate tilting member by an automatic operation or a remote operation.

Accordingly, in the head lamp for vehicle use of the present invention, the aiming and the leveling mechanism are independently provided, and it is possible to provide the leveling actuator inside the lamp body.

BRIEF DESCRIPTION OF THE DRAWING

The above objects and advantages of the present invention will become more apparent by describing in detail preferred embodiments thereof with reference to the accompanying drawings, in which:

FIG. 6 is a longitudinal cross-sectional view taken along the line VI—VI, showing an outline of a conventional head lamp for vehicle use; and FIG. 7 is a rear view of the head lamp of FIG. 6.

DETAILED DESCRIPTION OF THE PREFERRED EMBODIMENTS

Figure 1:
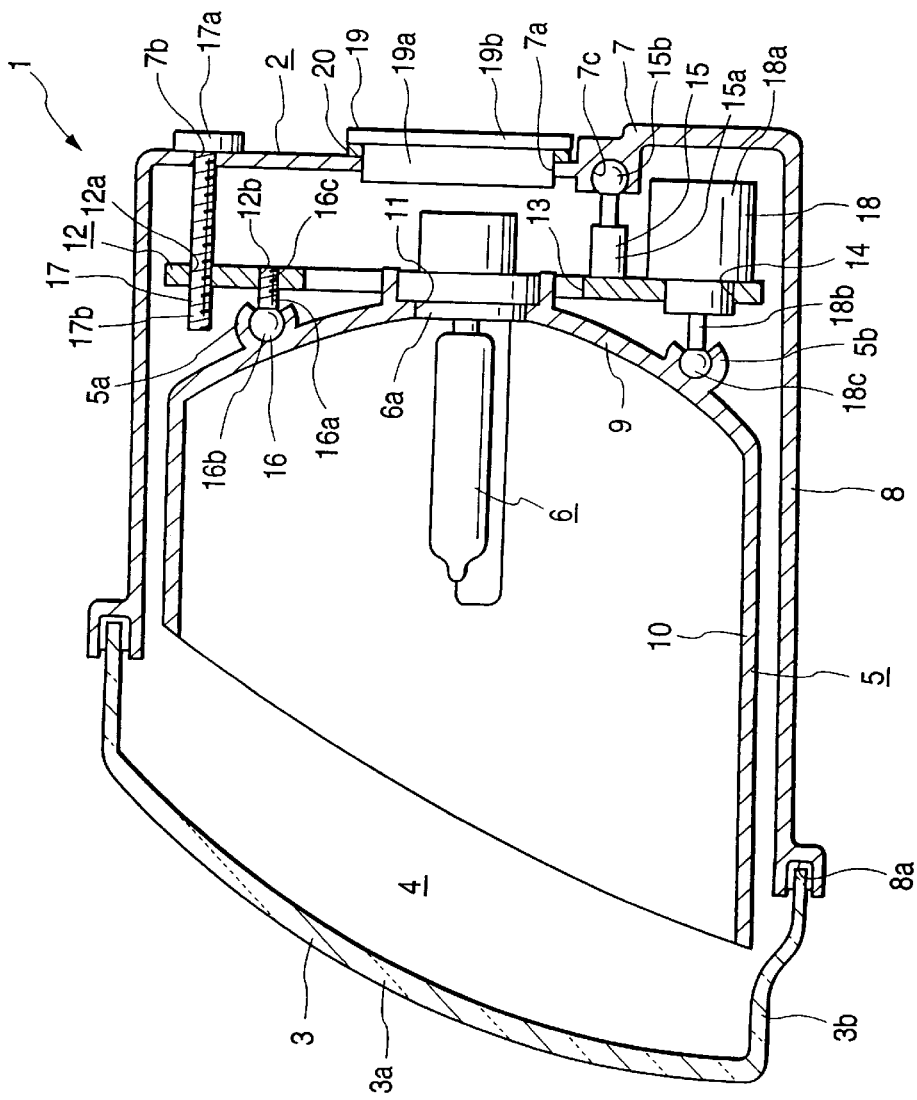
FIG. 1 is a longitudinal cross-sectional view taken along the line I—I of FIG. 2, showing an outline of an embodiment of the head lamp for vehicle use.

Referring to the drawings, an embodiment of the head lamp for vehicle use of the present invention will be explained below.

A head lamp 1 includes a light source bulb 6 attached to a reflector 5 arranged in a lighting device space 4 which is formed by a container-shaped lamp body 2, having an open front portion, and a lens 3 which covers the opening of the lamp body 2 as shown in FIG. 1.

The lamp body 2 is integrally composed of a rear face section 7 and a cylindrical section 8 which protrudes toward the front from a circumferential edge of the rear face section 7. In the rear face section 7, a hole 7a is provided for replacing a light source bulb 6 disposed in the lighting device space 4. When viewing the rear face section from back to front (as in FIG. 3), insertion holes 7b, 7b are respectively formed on the left upper end portion of the rear face section 7 and near the lower right end of the rear face section 7. In FIG. 1, only one insertion hole 7b is shown. On the inner face of the rear face section 7, a spherical support recess 7c is provided below the left insertion hole 7b and at substantially the same height as the right insertion hole 7b. Further, at the front end of a cylindrical section 8 of the lamp body 2, a recess groove 8a is provided, which opens toward the front.

A lens 3 is integrally composed of a front face section 3a, which is directed to the front, and a side face section 3b which protrudes backward from the circumferential edge of the front face section 3a. The lens 3 is attached to the lamp body 2 via a gasket (not shown), which is inserted into the recess groove 8a of the lamp body 2, wherein a rear end of the side face section 3b is inserted into the recess groove 8a of the lamp body 2.

The reflector 5 includes a concave section 9, the center of which protrudes backward, and a side face section 10 which protrudes toward the front from the circumferential edge of the concave section 9. On the rear face of the concave section 9 of the reflector 5, there are provided three spherical recess sections 5a, 5a, 5b which open toward the rear of the head lamp. Only one spherical recess section 5a is shown in FIG. 1. The spherical recess sections 5a, 5a are located transversely from each other, and near an upper end of the concave section 9. The spherical recess section 5b is located below the left spherical recess section 5a near the lower end of the concave section 9. In the concave section 9 of the reflector 5, a light bulb attaching hole 11 is formed.

The light source bulb 6 is a discharge lamp tube having a base section 6a, one portion of which is detachably attached to the light bulb attaching hole 11 of the reflector 5.

The intermediate tilting member 12 is a rectangular plate, the width being longer than the length. The intermediate tilting member 12 is arranged on the front side of the rear face section 7 of the lamp body 2 so as to be disposed between the concave section 9 of the reflector 5 and the rear face section 7. A rectangular insertion hole 13 is formed at substantially the center of the intermediate tilting member 12.

Figure 3:
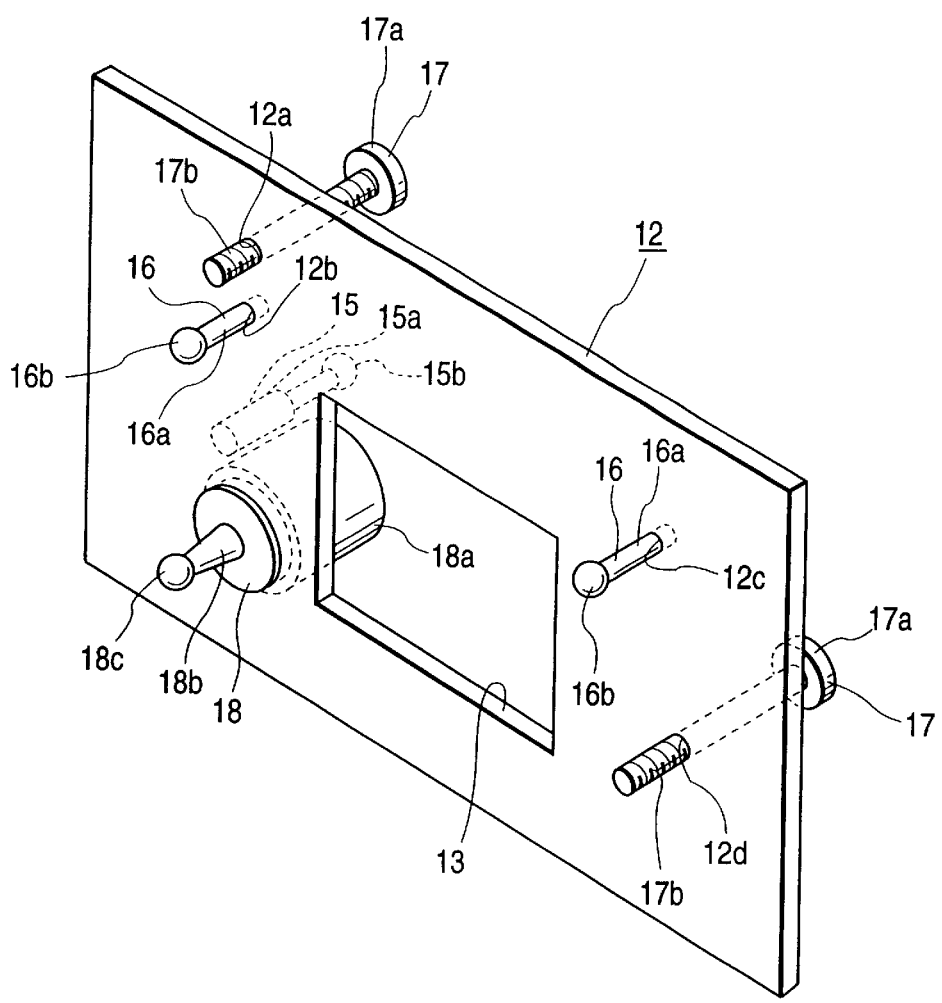
FIG. 3 is an enlarged perspective view showing arrangement positions of the members of the aiming and the leveling mechanism with respect to the intermediate tilting member.

In the intermediate tilting member 12, screw holes 12a, 12b are formed, one above the other, near the upper left end of the intermediate tilting member 12 (see FIG. 3). Also, in the intermediate tilting member 12, an actuator attaching hole 14 is provided below the screw hole 12b near the lower left end of the intermediate tilting member 12. Additionally, a screw hole 12c is provided near the upper right end of the intermediate tilting member 12, to the right of the screw hole 12b (see FIG. 3). A screw hole 12d is formed below the screw hole 12c so as to be near the lower end of the intermediate tilting member 12. A support 15 is provided in the intermediate tilting member 12, which is directed backward, above the actuator attaching hole 14 (see FIG. 1).

The support 15 protrudes backward from the upper side of the actuator attaching hole 14 of the intermediate tilting member 12. The support 15 is composed of a shaft section 15a, which protrudes from the intermediate tilting member 12, and a spherical section 15b which is formed at an end of the shaft section 15a. The shaft section 15a and the spherical section 15b are integrated into one body.

The pivot member 16, 16 comprises a shaft section 16a, 16a and a spherical section 16b, 16b which is formed at one end of the shaft section 16a, 16a. The other end of the shaft section 16a, 16a is formed into a screw section 16c, 16c.

An aiming screw 17, 17 comprises a head section 17a, 17a, which is a section to be operated, and a screw shaft section 17b, 17b. The head section 17a, 17a and the screw shaft section 17b, 17b are integrated into one body.

In a leveling actuator 18, a connecting shaft 18b protrudes toward the front from a main body 18b, and a spherical section 18c is integrally formed at an end of the connecting shaft 18b. The connecting shaft 18b of the leveling actuator 18 is moved in the longitudinal direction by an automatic or remote control.

Figure 2:
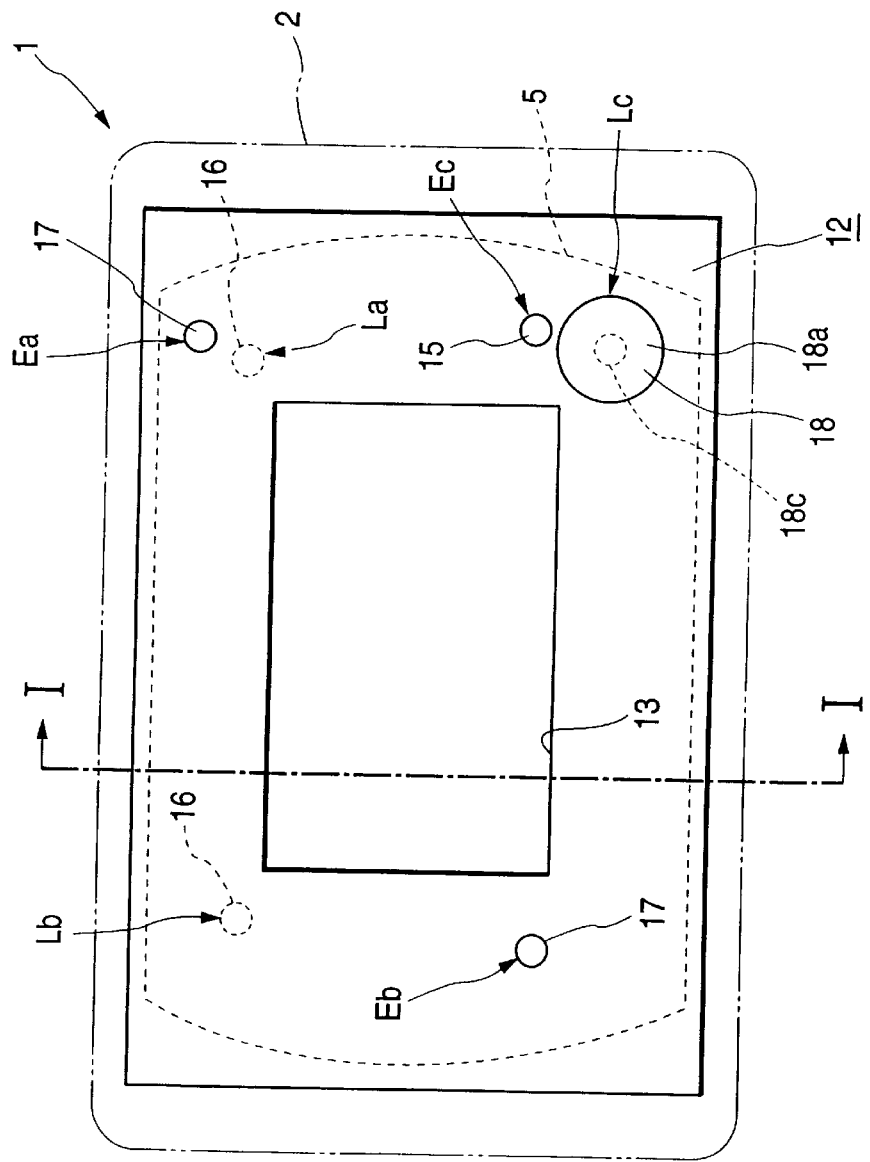
FIG. 2 is a rear view of the head lamp showing the arranging positions of the aiming and the leveling mechanism.

The reflector 5 is supported by the intermediate tilting member 12 at three points La, Lb and Lc via the leveling adjusting mechanism as shown in FIGS. 1 to 3. The leveling adjusting mechanism is a mechanism for adjusting an extending direction of the optical axis which changes by a load being carried by the vehicle. The leveling adjusting mechanism includes the above pivot members 16, 16, the leveling actuator 18 and spherical recess sections 5a, 5a, 5b formed in the reflector 5.

The screw shaft 16a, 16a of the pivot member 16, 16 is respectively screwed to the screw hole 12b, 12c of the intermediate tilting member 12, and at the same time the spherical section 16b, 16b is respectively engaged with the spherical recess 5a, 5a formed in the reflector 5. Due to the foregoing, the reflector 5 is supported by the intermediate member 12 at two support points La and Lb via the pivot members 16, 16. The main body 18a of the leveling actuator 18 is attached to the actuator attaching hole 14 of the intermediate tilting member 12, while the spherical section 18c is engaged with the spherical recess 5b formed in the reflector 5. Due to the foregoing, the reflector 5 is supported by the intermediate tilting member 12 at support point Lc via the leveling actuator 18.

Under the condition wherein the reflector 5 is supported by the intermediate tilting member 12 as described above, a rear end portion of the reflector 5 is inserted into the insertion hole 13 of the intermediate tilting member 12, and a rear half portion of the base section 6a of the light source bulb 6 is protruded backward from the insertion hole 13.

The intermediate tilting member 12 is supported by the lamp body 2 at three support points Ea, Eb and Ec via the aiming adjusting mechanism as shown in FIGS. 1 to 3. The aiming adjusting mechanism is a mechanism for adjusting an extending direction of the optical axis upon completion of manufacturing a vehicle or upon an official check-out of a vehicle. The aiming adjusting mechanism includes the aiming screws 17, 17, the support 15, the screw holes 12a, 12d formed in the intermediate tilting member 12, and the support recess 7c formed in the lamp body 2.

Under the condition that the screw shaft sections 17b, 17b of the aiming screw 17, 17 are respectively inserted from the rear side into the insertion holes 7b, 7b of the lamp body 2, the screw sections 17b, 17b are screwed into the screw holes 12a, 12d of the intermediate tilting member 12. Due to the foregoing, the intermediate tilting member 12 is supported by the lamp body 12 at two support points Ea and Eb via the aiming screws 17, 17. When the aiming screws 17, 17 are inserted into the insertion holes 7b, 7b, the aiming screws 17, 17 are supported in such a manner that they can be rotated with respect to the lamp body 2 and they can not be moved in the axial direction. When the spherical section 15b of the support 15, which protrudes from the intermediate tilting member 12, is engaged with the support recess 7c formed in the lamp body 2, the intermediate tilting member 12 is supported by the lamp body 2 at support point Ec via the support 15.

As described above, the reflector 5 is supported by the intermediate tilting member 12 at three points La, Lb and Lc via the leveling mechanism, while the intermediate tilting member 12 is supported by the lamp body 2 at three points Ea, Eb and Ec via the aiming mechanism.

A hole 7a of the lamp body 2 is closed by a cover 19. The cover 19 is composed of a cylindrical engaging section 19a, the length being relatively short in the axial direction, and a flange section 19b which protrudes outside from the engaging section 19a The cylindrical engaging section 19a and the flange section 19b are integrated into one body. When the engaging section 19a is engaged with the hole 7a, the cover 19 can be attached to the lamp body 2. In this case, a ring-shaped sealing member 20 is interposed between the flange section 19b and the opening edge of the hole 7a. Due to the above arrangement, it is possible to prevent entrance of water and dust from the outside into the lighting device space 4.

In this vehicle head lamp 1, an aiming adjustment and a leveling adjustment are conducted as follows.

The aiming adjustment is performed by rotation of the heads 17a, 17a of the aiming screws 17, 17.

For example, the head 17a of the left aiming screw 17 is rotated, and the screw shaft 17b is screwed into, or screwed back from, the screw hole 12a of the intermediate tilting member 12 according to the rotating direction of the screw head 17a, so that an interval between the intermediate tilting member 12 and the lamp body 2 at support point Ea is changed. Due to the foregoing, the intermediate tilting member 12 is tilted in the vertical direction about a tilting axis which is a straight line connecting the two rest support points Eb and Ec. Therefore, according to the tilting motion of the intermediate tilting member 12, the reflector 5 which is supported by the intermediate tilting member 12 is also tilted. Due to the foregoing, an aiming adjustment can be conducted in the vertical direction.

Likewise, the head 17a of the right aiming screw 17 is rotated and the screw shaft 17b is screwed into, or screwed back from, the screw hole 12d of the intermediate tilting member 12 according to the rotating direction of the screw head 17a, so that an interval between the intermediate tilting member 12 and the lamp body 2 at support point Eb is changed. Due to the foregoing, the intermediate tilting member 12 is tilted in the horizontal direction about a tilting axis which is a straight line connecting the two rest support points Ea and Ec. Therefore, according to the tilting motion of the intermediate tilting member 12, the reflector 5 which is supported by the intermediate tilting member 12 is also tilted. Due to the foregoing, an aiming adjustment can be conducted in the horizontal direction.

The leveling adjustment is conducted when the connecting shaft 18b of the leveling actuator 18 is moved in the longitudinal direction.

When the connecting shaft 18b is moved in the longitudinal direction, an interval between the reflector 5 and the intermediate tilting member 12 is changed at support point Lc. Due to the foregoing, the reflector 5 is tilted in the vertical direction about a tilting axis which is a straight line connecting the two rest support points La and Lb. Accordingly, the leveling adjustment can be performed.

As described above, in the head lamp 1 for vehicle use, the intermediate tilting member 12 is tiltably supported by the lamp body 2 via the aiming adjustment mechanism, while the reflector 5 is tiltably supported by the intermediate tilting member 12 via the leveling adjustment mechanism.

According to the above arrangement, the leveling actuator 18 is attached to the intermediate tilting member 12 which is arranged in the lighting device space 4. Consequently, the leveling actuator 18 does not protrude backward from the lamp body 2, and an attaching position of the leveling actuator 18 with respect to the head lamp 1 for vehicle use is not limited to a specific position. Therefore, it becomes unnecessary to give consideration to the attaching position of the leveling actuator 18 for each type of vehicle. Accordingly, it is possible to arrange the vehicle head lamp 1 in a variety of arrangement spaces of any type of vehicle.

Further, it becomes unnecessary to change the attaching position of the leveling actuator 18 with respect to the head lamp 1 for vehicle use. Therefore, it is unnecessary to change other support points La, Lb, Ea, Eb and Ec of the aiming and the leveling adjustment mechanisms. Accordingly, forming the position of each support point with respect to the head lamp 1 for vehicle use is not restricted.

This arrangement is important because in the conventional head lamp "a" for vehicle use, when the rubber cover "m" is used and the inner circumferential edge "n" of the rubber cover "m" is attached to the light source bulb "f" fixed to the reflector "e" and the outer circumferential edge "o" is attached to the lamp body "b" so that the insertion hole "g" of the lamp body "b" can be closed, the following problems may be encountered. When the reflector "e" is tilted with respect to the lamp body "b" during aiming and leveling adjustments, the rubber cover "m" becomes a resistance to the tilting movement of the reflector "e". Therefore, tilting can not be smoothly conducted. In particular, the leveling adjustment must be conducted each time an extending direction of the optical axis is changed by the weight of a load carried by a vehicle. Therefore, when the reflector can not be smoothly tilted, serious problems may be caused.

However, in the above head lamp 1 for vehicle use, the hole 7a used for replacing the light source bulb 6 is formed on the lamp body 2 and closed by the cover 19, and the light source bulb 6 is attached to the light bulb attaching hole 11 of the reflector 5. Accordingly, unlike the conventional head lamp "a" for vehicle use, the head lamp 1 of the present invention has no resistance with respect to the tilting motion of the reflector 5 when aiming and leveling adjustments are conducted. Therefore, the reflector 5 can be smoothly tilted.

Figure 4:
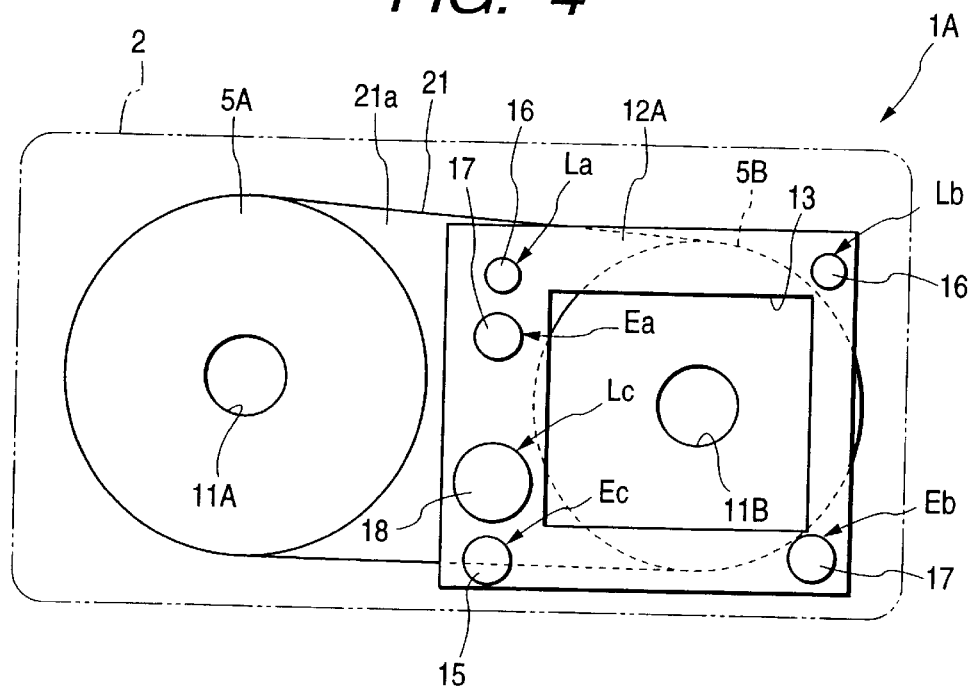
FIG. 4 is a rear view of the head lamp showing an embodiment having an intermediate tilting member and two integrally formed reflectors.

FIG. 4 is a rear view showing a head lamp 1A for vehicle use in which two reflector sections are integrally provided and an intermediate tilting member is provided so that aiming and leveling adjustment can be conducted.

Referring to FIG. 4, the head lamp 1A for vehicle use is explained as follows. The head lamp 1A only differs from the head lamp 1 by the following three points. First, two reflectors are provided. Second, the support points La, Lb, Lc and Ea, Eb, Ec of the aiming and the leveling adjustment mechanisms are located at different positions. Third, the intermediate tilting member is provided only at the rear of one of the reflectors. For the above reasons, when the head lamp 1A is explained, only the points which differ from the head lamp 1 will be explained in detail. Concerning other points, like reference characters are used to indicate like parts in the head lamps 1 and 1A, and explanations are omitted.

In the lighting device space 4 of the head lamp 1A, a reflector body 21 is provided. The reflector body 21 includes a first reflector 5A and a second reflector 5B as shown in FIG. 4. As mentioned above, FIG. 4 illustrates a rear view of the head lamp 1A, and thus, for purposes of this discussion, the right side of the head lamp 1A is on the left of the illustration and the left side of the head lamp 1A is on the right. In the head lamp 1A, the right area functions as a low beam section, and the left area functions as a high beam section. Accordingly, the first reflector 5A located on the right is a reflector for the low beam, and the second reflector 5B located on the left is a reflector for the high beam.

In the reflector body 21, a connecting section 21a is provided for connecting the first reflector 5A with the second reflector 5B. The first reflector 5A, second reflector 5B and connecting section 21a are formed in the reflector body 21 and integrated with each other into one body. Light source bulbs (not shown) are respectively attached into light bulb attaching holes 11A, 11B of the first reflector 5A and the second reflector 5B.

An intermediate tilting member 12A is arranged on the rear side of the second reflector 5B, which is located on the left, and also on the rear side of the connecting section 21a. In other words, the intermediate tilting member 12A is located behind the first reflector 5B, except for a right end portion which is located behind the connecting section 21a.

The reflector body 21 is supported by the intermediate tilting member 12A at three support points La, Lb and Lc via the leveling adjustment mechanism. The intermediate tilting member 12A is supported by the lamp body 2 at three support points Ea, Eb and Ec via the aiming adjustment mechanism.

Support point La is formed at the right upper end of the intermediate tilting member 12A, and support point Lb is formed at the left upper end of the intermediate tilting member 12A at the same height as support point La. Support point Lc is formed at the right lower end of the intermediate tilting member 12A.

Accordingly, support point La is formed by the connection of the connecting section 21a of the reflector body 21 to a right upper end of the intermediate tilting member 12A, and support point Lc is formed by the connection of the connecting section 21a of the reflector body 21 to a right lower end of the intermediate tilting member 12A via the leveling actuator 18.

Support point Ea is formed below support point La, and support point Eb is formed at the lower left end of the intermediate tilting member 12A. Support point Ec is formed below support point Lc.

Aiming adjustment of the head lamp 1A in the vertical direction is conducted as follows. When the aiming screw 17 provided at support point Ea is rotated, an interval between the intermediate tilting member 12A and the lamp body 2 at support point Ea is changed. Therefore, the intermediate tilting member 12A is tilted in the vertical direction about a tilting axis which is a straight line connecting the two rest support points Eb and Ec. At this time, the reflector body 21 supported by the intermediate tilting member 12A is tilted in accordance with the tilting motion of the intermediate tilting member 12A.

Aiming adjustment of the head lamp 1A in the horizontal direction is conducted as follows. When the aiming screw 17 provided at support point Eb is rotated, an interval between the intermediate tilting member 12A and the lamp body 2 at support point Eb is changed. Therefore, the intermediate tilting member 12A is tilted in the horizontal direction about a tilting axis which is a straight line connecting the two rest support points Ea and Ec. At this time, the reflector body 21 supported by the intermediate tilting member 12A is tilted in accordance with the tilting motion of the intermediate tilting member 12A.

As described above, in the head lamp 1A for vehicle use, since the reflector body 21 is tilted with respect to the intermediate tilting member 12A, aiming adjustment of the first reflector 5A and that of the second reflector 5B are simultaneously conducted.

Leveling adjustment of the head lamp 1A for vehicle use is conducted as follows. When the connecting shaft 18b of the leveling actuator 18 is moved in the longitudinal direction, an interval between the reflector body 21 and the intermediate tilting member 12A at support point Lc is changed, and the reflector 21 is tilted in the vertical direction around a tilting axis which is a straight line connecting the two rest support points La and Lb.

As described above, in the head lamp 1A for vehicle use, since the reflector body 21 is tilted with respect to the intermediate tilting member 12A, leveling adjustment of the first reflector 5A and that of the second reflector 5B are simultaneously conducted in the same manner as the aiming adjustment.

As described above, in the head lamp 1A for vehicle use, the first reflector 5A and the second reflector 5B are formed into one integral body. Therefore, for example, when a head lamp for vehicle use is made, in which it is necessary to provide two reflectors such as a low beam reflector and a high beam reflector, it is unnecessary to compose the reflector for each beam. Therefore, it is possible to reduce a manufacturing cost of the head lamp for vehicle use.

Figure 5:
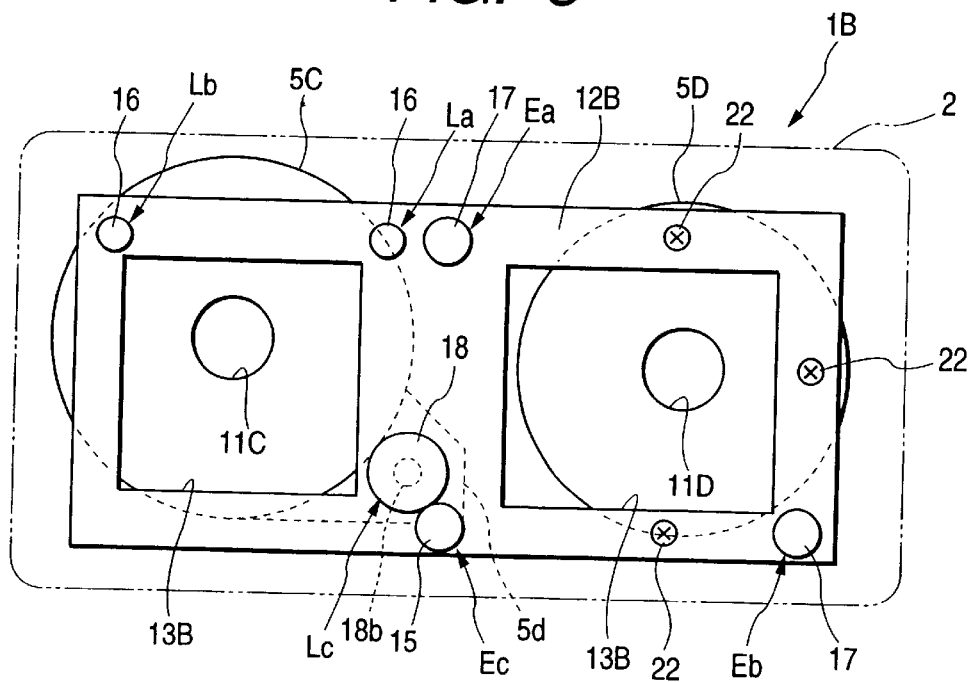
FIG. 5 is a rear view of the head lamp showing an embodiment having an intermediate tilting member and two separately formed reflectors.

FIG. 5 is a rear view showing a head lamp 1B for vehicle use in which two reflectors, which are individually formed, are provided and an intermediate tilting member is provided for conducting aiming and leveling adjustments.

Referring to FIG. 5, the head lamp 1B for vehicle use is explained as follows. The head lamp 1B for vehicle use is different from the head lamp 1 for vehicle use, which has been described before, only at the following three points. First, two reflectors are provided. Second, the support points La, Lb, Lc and Ea, Eb, Ec of the aiming and the leveling adjustment mechanism have different positions. Third, one intermediate tilting member is provided for the two reflectors. For the above reasons, when the head lamp 1B for vehicle use is explained, only these differing points will be explained in detail. Concerning other points, like reference characters are used to indicate like parts in the head lamps 1 and 1B, and explanations are omitted here.

In the lighting device space of the head lamp 1B, a high beam reflector 5D and a low beam reflector 5C are provided as shown in FIG. 5. The viewpoint of FIG. 5 is similar to FIG. 4, in that the rear of the head lamp is illustrated and, thus, the left of the drawing reflects the right side of the head lamp and the right of the drawing reflects the left side of the head lamp. The reflector 5C on the right is used for a low beam, and the reflector 5D on the left is used for a high beam. Light source bulbs (not shown) in the drawing are respectively attached into light bulb attaching holes 11C, 11D of the low beam reflector 5C and the high beam reflector 5D. At a rear lower end of the low beam reflector 5C, there is provided an actuator connecting section 5d protruding to the left of the reflector 5C. A spherical recess (not shown) is provided in the actuator connecting section 5d, which opens backward (out of the page).

The intermediate tilting member 12B is formed in such a manner that the width is longer than the length. In the intermediate tilting member 12B, rectangular insertion holes 13B, 13B are formed which are separate from each other in the transverse direction.

In the head lamp 1B, the low beam reflector 5C is supported by the intermediate tilting member 12B at three points La, Lb, Lc via the leveling mechanism, and the intermediate tilting member 12B is supported by the lamp body 2 at three points Ea, Eb, Ec via the aiming mechanism.

Support point La is formed to the right of the center of the intermediate tilting member 12B in the transverse direction corresponding to an upper end of the intermediate tilting member 12B. Support point Lb is formed on the right end of the intermediate tilting member 12B at the same height as support point La. Support point Lc is formed at substantially the center of the intermediate tilting member 12B in the transverse direction at a lower portion of the intermediate tilting member 12B.

Accordingly, support point Lc is formed by the connection of an actuator connecting section 5d of the low beam reflector 5C to a portion near the lower end of the intermediate tilting member 12B via the leveling actuator 18.

Support point Ea is formed to the left of support point La, and support point Eb is formed at a lower left end position of the intermediate tilting member 12B. Support point Ec is formed below, and to the left of, support point 1C.

The high beam reflector 5D is fixed to the intermediate tilting member 12B by mounting screws 22, 22, 22 at the upper, lower and left ends.

Aiming adjustment of the head lamp 1B for vehicle use in the vertical direction is conducted as follows. When the aiming screw 17 provided at support point Ea is rotated, an interval between the intermediate tilting member 12B and the lamp body 2 at support point Ea is changed. Therefore, the intermediate tilting member 12B is tilted in the vertical direction about a tilting axis which is a straight line connecting the two rest support points Eb and Ec. At this time, the high beam reflector 5D fixed to the intermediate tilting member 12B is tilted in accordance with the tilting motion of the intermediate tilting member 12B.

Since the low beam reflector 5C is supported by the intermediate tilting member 12B via the leveling mechanism, when the intermediate member 12B is tilted, the low beam reflector 5C is also tilted together with the high beam reflector 5D. Accordingly, aiming adjustment of the low beam reflector 5C in the vertical direction can also be conducted.

Aiming adjustment of the head lamp 1B for vehicle use in the transverse direction is conducted as follows. When the aiming screw 17 provided at support point Eb is rotated, an interval between the intermediate tilting member 12B and the lamp body 2 at support point Eb is changed. Therefore, the intermediate tilting member 12B is tilted in the transverse direction about a tilting axis which is a straight line connecting the two rest support points Ea and Ec. At this time, the high beam reflector 5D fixed to the intermediate tilting member 12B is tilted in accordance with the tilting motion of the intermediate tilting member 12B.

Since the low beam reflector 5C is supported by the intermediate tilting member 12B via the leveling mechanism, when the intermediate member 12B is tilted, the low beam reflector 5C is also tilted together with the high beam reflector 5D. Accordingly, aiming adjustment of the low beam reflector 5C in the transverse direction can also be conducted.

Accordingly, in the head lamp 1B, aiming adjustment of the low beam reflector 5C and aiming adjustment of the high beam reflector 5D are simultaneously conducted.

Leveling adjustment of the head lamp 1B for vehicle use is conducted as follows. When the connecting shaft 18b of the leveling actuator 18 is moved in the longitudinal direction, an interval between the low beam reflector 5C and the intermediate tilting member 12B at support point Lc is changed, and the low beam reflector 5C is tilted in the vertical direction about a tilting axis which is a straight line connecting the two rest support points La and Lb. The high beam reflector 5D is fixed to the intermediate tilting member 12B, and the intermediate tilting member 12B is not tilted. Therefore, the high beam reflector 5D is not tilted.

Consequently, in the head lamp 1B for vehicle use, the leveling adjustment of the low beam reflector 5C is performed without also performing a leveling adjustment of the high beam reflector 5D.

As described above, in the head lamp 1B for vehicle use, only leveling adjustment of the low beam reflector 5C is conducted. This is preferable, however, because the low beam reflector 5C is used for a low beam while the high beam reflector 5D is used for a high beam. When an optical axis of the low beam reflector 5C is changed in such a manner that it is extended by a weight of a load carried by a vehicle, it is necessary to conduct leveling adjustment so that the occurrence of glare can be prevented. Since the high beam reflector 5D is used for a high beam, the high beam reflector 5D originally irradiates upward compared with the low beam reflector. Thus, it is not necessary to conduct a leveling adjustment of the high beam reflector 5D. Therefore, no problems are caused even when leveling of the high beam reflector is not conducted.

As described above, in the head lamp 1B for vehicle use, the high beam reflector 5D is fixed to the intermediate tilting member 12B. Accordingly, no leveling adjustment is conducted on the high beam reflector 5D, that is, the high beam reflector 5D is not tilted with respect to the intermediate tilting member 12B. Therefore, concerning the high beam reflector 5D, unlike the conventional head lamp "a" for vehicle use, it is unnecessary to give consideration to a resistance generated by the rubber cover "m" when the reflector is tilted.

Accordingly, in the head lamp 1B, instead of using the cover 19 for closing the hole 7a of the lamp body 2, it is possible to use the rubber cover "m" shown in the conventional head lamp "a". In other words, it is possible to use the rubber cover "m", the outer circumferential edge of which is attached to the opening edge of the hole 7a of the lamp body 2, and the inner circumferential edge of which is attached to the base section 6a of the light source bulb 6 attached to the light bulb attaching hole 1D of the reflector 5D since the leveling adjustment of the reflector 5D is not conducted.

As described above, in the head lamp 1B for vehicle use, it is possible to use a rubber cover instead of the cover 19. Therefore, the degree of freedom of designing can be enhanced, and parts such as rubber covers, which are used for the conventional head lamps "a" for vehicle use, can be used for the head lamp 1B for vehicle use.

In the above head lamp 1B for vehicle use, the high beam reflector 5D is fixed to the intermediate tilting member 12B by the mounting screws 22, 22, 22. However, the high beam reflector 5D and the intermediate tilting member 12B may be integrated with each other into one body.

When the high beam reflector 5D and the intermediate tilting member 12B are integrated into one body, it is possible to reduce the number of parts, and the manufacturing cost of the head lamp 1B for vehicle use can be decreased.

The profile and structure of each aspect of the above embodiment are only one example in which the present invention is carried out. Therefore, it should be noted that the technical scope of the present invention is not limited to the above specific embodiment.

As described above, a bead lamp for vehicle use of the present invention includes a lamp body formed into a container-shape and having an opening. A lens covers the opening of the lamp body and a reflector reflects light emitted from a light source. The light source is a light source bulb comprising a discharge lamp. A reflector is arranged in a lighting device space formed between the lamp body and the lens. An aiming adjusting and a leveling adjusting mechanism are provided for adjusting a direction of an irradiation axis of light by changing a tilting angle of the reflector with respect to a vehicle body. An intermediate tilting member is tiltably supported by the lamp body and the reflector is tiltably supported by the intermediate tilting member, wherein the intermediate tilting member is supported by the lamp body at three points, one point being a tilting fulcrum, and the other two points being supported by an aiming adjusting member for changing positions of the support points with respect to the lamp body. The reflector is supported by the intermediate tilting member at three support points, two points being formed into tilting fulcrums, and the other one point being supported by a leveling actuator for changing a position of the support point with respect to the intermediate tilting member by an automatic operation or a remote operation.

Accordingly, the leveling actuator is attached to the intermediate tilting member arranged in the lighting device space. Therefore, no leveling actuator protrudes backward from the lamp body. Consequently, an attaching position at which the leveling actuator is attached to the head lamp for vehicle use is not restricted to a specific position, that is, it is unnecessary to give consideration to the attaching position, at which the leveling actuator is attached to the head lamp for vehicle use, for any type of vehicle, and it is possible to arrange the head lamp for vehicle use in an arrangement space of any type of vehicle.

It is unnecessary to change a mounting position of the leveling actuator with respect to the head lamp for vehicle use. Therefore, it is unnecessary to change positions of other support points of the aiming and the leveling adjustment mechanism. That is, the positions at which the support positions are formed are not restricted with respect to the head lamp for vehicle use.

In addition, the head lamp may have a reflector which includes a reflector body having a first reflector section and a second reflector section, to which light source bulbs are respectively attached.

Accordingly, for example, when a head lamp for vehicle use having two reflectors such as a high beam reflector and a low beam reflector is formed, it is unnecessary to form the reflectors individually. Therefore, the manufacturing cost of the head lamp for vehicle use can be reduced.

Also, the reflector may be composed of a low beam reflector for a low beam and a high beam reflector for a high beam to which light source bulbs are respectively attached, wherein the low beam reflector and the high beam reflector are individually formed so as to be separate from each other. In this case, the intermediate tilting member is formed so that only the low beam reflector is supported by the intermediate tilting member at three support points, and the high beam reflector is fixed to the intermediate tilting member.

Since a leveling adjustment is not conducted on the high beam reflector with the above embodiment, unlike the conventional head lamp for vehicle use, it is unnecessary to give consideration to resistance generated by the rubber cover which comes into contact with the reflector tilted in the case of leveling adjustment, and the opening on the rear side of the lamp body is closed. Accordingly, it is possible to use a rubber cover which is attached to an edge of the opening and also attached to a portion of a light source bulb fixed to the light bulb mounting hole. Accordingly, the degree of freedom of designing a head lamp for vehicle use can be enhanced, and at the same time, parts such as rubber covers can be used for any type of vehicle.

Also, the high beam reflector and the intermediate tilting member may be integrated into one body with each other. Therefore, the number of parts can be reduced, to reduce the manufacturing cost of a head lamp for vehicle use.

Also, an opening for replacing the light source bulb may be formed in the lamp body, and a cover for closing the opening may be formed in the lamp body. Therefore, unlike the conventional head lamp for vehicle use, no resistance is generated when the reflector is tilted in the case of aiming adjustment and leveling adjustment. Accordingly, the reflector can be smoothly tilted.

It will be apparent to those skilled in the art that various modifications and variations can be made in the manifold unit according to the present invention without departing from the spirit or scope of the invention. Thus, it is intended that the present invention cover the modifications and variations of the invention provided they come within the scope of the appended claims and their equivalents.

What is claimed is:

1. A head lamp for vehicle use, comprising:

a lamp body having an opening;

a lens covering the opening of the lamp body, wherein a lighting device space is formed between the lamp body and the lens;

a reflector is provided in the lighting device space for reflecting light emitted from a light source, wherein the light source is a light source bulb including a discharge lamp;

an aiming adjusting mechanism and a leveling adjusting mechanism which adjust a direction of the reflected light by changing a tilting angle of the reflector with respect to a vehicle body; and an intermediate tilting member tiltably supported by the lamp body and the reflector tiltably supported by the intermediate tilting member, wherein the intermediate tilting member is supported by the lamp body at three points, one point acting as a tilting fulcrum and the other two points acting with an aiming adjusting member for changing positions of the intermediate tilting member with respect to the lamp body, and wherein the reflector is supported by the intermediate tilting member at three support points, two points acting as tilting fulcrums, and the other point acting with a leveling actuator for changing a position of the reflector with respect to the intermediate tilting member by an automatic operation or a remote operation.

2. The head lamp for vehicle use according to claim 1, wherein the reflector is a reflector body having a first reflector section and a second reflector section, to which light source bulbs are respectively attached, the first reflector section and the second reflector section being connected to each other.

3. The head lamp for vehicle use according to claim 1, wherein the reflector includes a low beam reflector for a low beam and a high beam reflector for a high beam, to which light source bulbs are respectively attached, the low beam reflector and the high beam reflector being separate from each other, and wherein the low beam reflector is supported by the intermediate tilting member at three support points, and the high beam reflector is fixed to the intermediate tilting member.

4. The head lamp for vehicle use according to claim 3, wherein the high beam reflector and the intermediate tilting member are formed into one integral body.

5. The head lamp for vehicle use according to claim 1, wherein an opening for replacing the light source bulb is formed in the lamp body, and a cover for closing the opening is detachably attached to the lamp body.

6. The head lamp for vehicle use according to claim 1, wherein the leveling actuator is provided within the lamp body without protruding from a back of the lamp body.

* * * * *